United States Patent [19]

Rieder et al.

[11] Patent Number: 4,982,507
[45] Date of Patent: Jan. 8, 1991

[54] LENGTH MEASURING SYSTEM

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 467,944

[22] Filed: Jan. 22, 1990

[30] Foreign Application Priority Data

Feb. 10, 1989 [AT] Austria ................................. A285/89

[51] Int. Cl.$^5$ ............................................. G01B 7/04
[52] U.S. Cl. ......................................... 33/702; 33/706
[58] Field of Search ................ 33/700, 702, 706, 707, 33/708

[56] References Cited

U.S. PATENT DOCUMENTS

| | | | |
|---|---|---|---|
| 3,816,002 | 6/1974 | Wien | 33/707 |
| 4,149,319 | 4/1979 | Nelle | 33/706 |
| 4,165,564 | 8/1979 | Burkhardt | 33/706 |
| 4,169,316 | 10/1979 | Ernst | 33/707 |
| 4,184,262 | 1/1980 | Kolb et al. | 33/707 |
| 4,262,423 | 4/1981 | Affa | 33/707 |
| 4,475,289 | 10/1984 | Nelle | 33/706 |
| 4,512,082 | 4/1985 | Burkhardt | 33/706 |
| 4,569,137 | 2/1986 | Ichikawa | 33/706 |
| 4,873,770 | 10/1989 | Lutimer et al. | 33/706 |

FOREIGN PATENT DOCUMENTS

| | | |
|---|---|---|
| 382966 | 4/1979 | Austria . |
| 2349944 | 10/1973 | Fed. Rep. of Germany . |
| 2510219 | 3/1975 | Fed. Rep. of Germany . |
| 2845542 | 10/1978 | Fed. Rep. of Germany . |
| 3201887 | 1/1982 | Fed. Rep. of Germany . |

OTHER PUBLICATIONS

Messen+Prüfen/Automatik, Jul./Aug. 1974, pp. 435 to 439.

*Primary Examiner*—Thomas B. Will
*Attorney, Agent, or Firm*—Kurt Kelman

[57] ABSTRACT

The length measuring system comprises a scale member provided with a scale and a scanning unit, which is movable along the scale and is guided by the scale member or by separate tracks, which are parallel to the scale and is coupled to an actuating member by a backlashless coupling. The two coupling elements of the coupling cross each other and are in point contact with each other and having engaging surfaces which are centered on axes which are normal to the longitudinal direction of the scale member. A backlash of the coupling is prevented by a permanent magnetic biasing set, which comprises parts which are respectively connected to the actuating member and to the scanning unit and consist of two permanent magnets or of a permanent magnet and an armature.

19 Claims, 3 Drawing Sheets

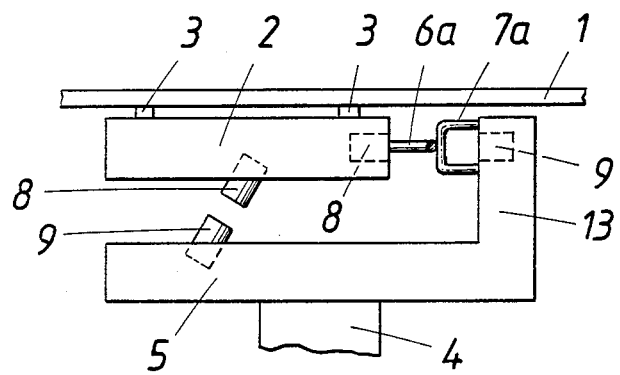
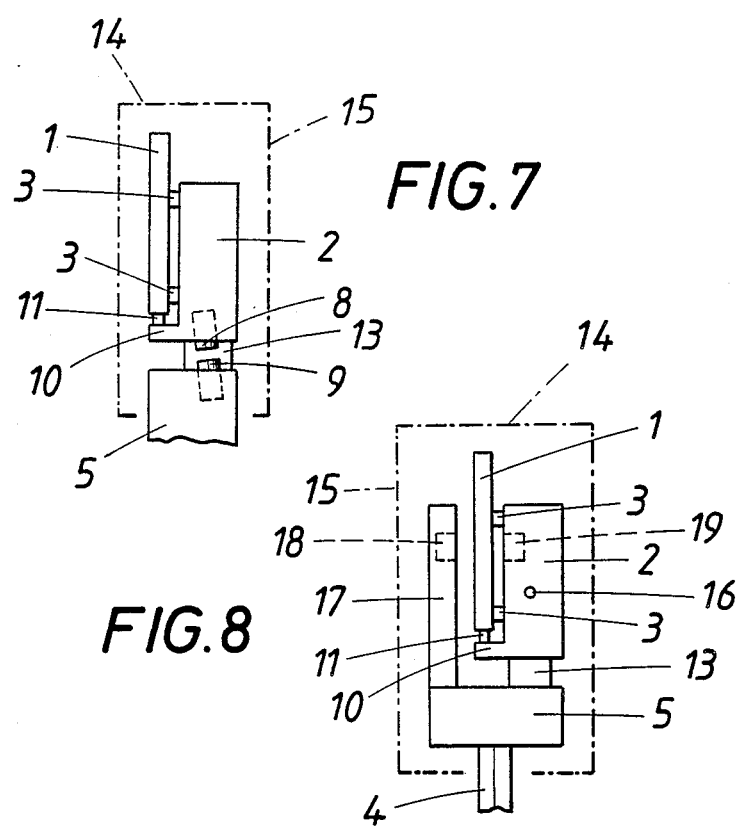

LENGTH MEASURING SYSTEM

BACKGROUND OF THE INVENTION

1. Field of the Invention

This invention relates to a length measuring system comprising a scale member provided with a scale and a scanning unit, which is movable along the scale and is guided by the scale member or by separate tracks, which are parallel to the scale and is coupled to an actuating member by a backlashless coupling, which has coupling elements, which are respectively connected to the scanning unit and to the actuating member and permit a movement of the actuating member relative to the scanning unit in a direction which is transverse to the scale and which are substantially in point contact with each other on engaging surfaces which are substantially curved about crossing axes which are normal to the tracks, and biasing elements are interposed between the actuating member and the scanning unit and urge the coupling elements against each other.

2. Description of the Prior Art

The length measuring system of the kind to which the invention relates may be so-called absolute-value measuring systems having a coded scale or incremental measuring systems in which the scale provided on the scale member consists of a bar pattern or other combination of bright and dark fields. The scale may be scanned by the scanning unit by optical, optoelectronic, capacitive, inductive or magnetic methods. In each case, the scale member and the scale will be designed to be suitable for the scanning method which is employed. The actuating member serves to connect the measuring system to a member which has a length or performs a movement which is to be measured. Such part may consist, e.g., of a tool carriage, which moves in a machine tool along a predetermined axis. As it is virtually impossible to ensure that the track for guiding such carriage is absolutely straight and/or absolutely parallel to the scale of the measuring system and vice versa, the actuating member must be able to move also transversely to the scale in such a manner that the actuating member and the scanning unit will not be caused to move relative to each other along the scale. That requirement can be met by the provision of coupling arrangement of the kind described hereinbefore.

AT-B-382,966 discloses a length measuring system of the kind described first hereinbefore. The object underlying that known length measuring system resides mainly to permit corrections to be made during the measuring operation in that the scanning unit is adjusted relative to the actuating member as the scanning unit is moved along a template. This is accomplished in that one coupling element consists of a vertical pin and the other coupling element consists of an eccentrically mounted roller, which extends transversely to the pin, and said coupling elements are urged against each other by a spring. Another spring biases an arm, which carries a roll carrier and which scans a template so that the eccentric roller is rotated in dipendence on the correcting template and corrections are thus introduced into the measuring operation.

DE-A-32 01 887 discloses a backlashfree coupling, which differs in kind from the couplings of the kind described hereinbefore and in an articulated joint having two degrees of freedom for translational movements in directions which are at right angles to the scale are arranged one behind the other. The linear guiding means may consist of a magnetic plate and of a member which has a spherical surface in contact with said plate.

It is known from DE-A-2 349 944 that a scanning unit can directly be guided on a scale member of glass and may be coupled to an actuating member by a leaf spring, which has a ball end extending into a socket formed in the scanning unit and exerts a resulting force acting along a space diagonal of the scale member to urge the ball into the socket and to urge the track-engaging means of the scanning unit against the scale member. In other embodimens of that basic design an additional guidance of the scanning unit is effected by means of rollers, which may alternatively engage track surfaces which are parallel to the scale and provided in an enclosure that contains the scale member.

From the periodical "Messen and Prüfen-/Automatik", July/August 1974, pages 435 to 439, it is known to provide a coupling consisting of two crossed rollers, which are urged against each other by springs. In other couplings the connection is established by non-buckling wires and leaf springs.

In the designs desclosed in DE-A-25 10 219 and DE-B-28 45 542, one coupling element carries a hardened metal ball and the other coupling element comprises a hard metal member, which has a planar surface that is normal to the scale, and springs are provided by which the two coupling elements are urged against each other. Said springs may consist of multiple-curvature spring clips, which engage the two coupling elements. In addition to said spring clips, coil springs which act on the associated tracks approximately normal to the line of action of the track-engaging elements of the scanning unit and are optionally adjustable and serve to urge the track-engaging elements against the associated tracks.

The known couplings have high manufacturing costs and are bulky and require great care to be taken in the mounting of the springs by which the coupling is held against backlash and of the springs which urge the scanning unit against the tracks. A basic disadvantage of arrangements which comprise springs resides in that all springs which may be employed may be caused to vibrate and for this reason the pressure forces which must be exerted to urge the coupling elements against each other and to urge the track engaging elements against the tracks are often much stronger than is required to ensure a coupling of the actuating member to the scanning unit and a satisfactory guidance of the scanning unit on the associated track surfaces as the scanning unit is usually very light in weight.

SUMMARY OF THE INVENTION

It is an object of the invention to provide a length measuring system which is of the kind described first hereinbefore and in which the backlashfree coupling consists of simple parts, which can easily be manufactured, and which is so designed that the measuring system and the coupling can be mounted and adjusted in a simple manner.

It is another object of the invention to provide such a measuring system in which the scanning unit is guided by simple means.

The first object set forth hereinbefore is accomplished in that the coupling elements provided on the actuating member and the scanning unit, respectively, are urged against each other by biasing means consisting of two parts, which exert magnetic forces on each other and consist of a permanent-magnetic part and a second part, which consists of another permanent-magnetic part or of an armature.

In such an arrangement the two coupling elements permit the actuating member and the scanning unit to be adjusted relative to each other transversely to the scale to the extent of the length of their curved engaging surfaces. In all positions which can be assumed by the coupling elements they are substantially in point contact with each other. Because pairs of permanent magnets or a permanent magnet and an armature are provided, the arrangement may be such that the single point of contact between the scanning unit and the actuating member is constituted by the point of contact between the two coupling elements. Such an arrangement will increase the freedom of the designer as regards the association of the scanning unit and the actuating member to each other and will effectively prevent a transmission of vibration from the actuating member to the scanning unit. In the previously known arrangement the occurrence of such vibration was the main reason for the requirement to relatively strong spring forces.

In a simple arrangement, the coupling elements consist of round pins, which cross each other at right angles and are so mounted that those portions of said pins which are adapted to engage each other are held against a movement in a direction which is transverse to the direction of the scanning movement. Such pins may be of an order of 1 mm in diameter and the pins may be polished or hardened and can easily be manufactured by a drawing operation. An important advantage which is afforded by the design in accordance with the invention resides in that the coupling can be engaged, and can be disengaged for a disassembly, without an actuation of mechanical elements, such as spring holders, which are required where springs are employed. If the two confronting surfaces of the permanent magnets have opposite polarities, the force by which the magnets attract each other can be utilized to assist the assembling of the coupling and such force will have to be overcome when the coupling is to be disassembled. If the confronting surfaces of the magnets have the same polarity, the repelling forces exerted by the magnets on each other will have to be overcome when the coupling is to be assembled and such repelling forces will assist the disassembling of the coupling.

The magnets need not act in the region in which the coupling elements engage each other but may be disposed at a substantial distance from the coupling. A fine adjustment may be permitted in that one coupling element is connected to the associated scanning unit or to the actuating member by an adjusting device by which the scanning unit and the actuating member can be longitudinally adjusted relative to each other to an exactly defined position.

The permanent magnets used to hold the coupling against backlash or separate permanent magnets or combinations of permanent magnets and armatures may be used to hold the track-engaging elements of the scanning unit against associated tracks provided on the scale member or on a surface of an enclosure containing the scale member so that the scanning unit and the scale member may be held in a desired position relative to each other.

In such an arrangement the lines of action of the associated magnets or magnet-armature combinations may be inclined to the direction of the scanning movement so that said magnets or combinations exert a resulting magnetic force having one component by which the coupling elements are urged against each other and at least one additional component by which the scanning unit is urged against the scale member or against at least one associated track. An inclined line of action may be provided in that the longitudinal axes of the magnets are adjusted to extend along such line of action or in that the magnets provided on the actuating member and on the scanning unit are offset from each other along the scale member and/or transversely thereto so that they exert forces acting along the scale member to hold the coupling against backlash and to exert forces acting transversely to the scale member in order to urge the scanning unit against the track surfaces.

Alternatively, additional permanent magnets or magnet-armature combinations may be mounted on the actuating member and on the scanning unit and may be arranged to exert magnetic forces by which the scanning unit is urged against the scale member and/or sliders or rollers provided on the scanning unit are urged against associated tracks. A plurality of magnet combiantions or magent-armature combinations will preferably be employed if the scanning unit is elongate and the coupling is connected to one end portion of such scanning unit.

Particularly where additional magnets are employed, at least one part of at least one permanent magnet combination or permanent magnet-armature combination may be mounted on the scanning unit on the front side of and spaced from the scale member consisting of glass and the other part of such combination may be mounted on the actuating member on the rear side of and spaced from the scale member.

In all cases a fine adjustment of the magnetic forces which are exerted may be permitted in that the magnets or the associated armatures are mounted to be linearly or pivotally adjustable so as to change their spacing from the associated other part or shields or parts for establishing a magnetic shunt to vary the effective magnetic force may be adjustably mounted on the front or rear side.

The overall combination will greatly be simplified if the coupling elements themselves consist of a permanent magnet combination or permanent magnet-armature combination and the permanent magnets or the permanent magnet and the armature are formed with the curved engaging surfaces which cross each other at right angles. Such coupling elements consisting of a combination of permanent magnets or of a permanent magnet and an armature will be self-biasing and will not occupy a larger space than the coupling elements of known arrangements.

The lines of action of the permanent magnet combinations or permanent magnet-armature combinations may preferably extend in the direction of the scanning movement.

If a larger play in a direction which is transverse to the direction of the scanning movement is desired, additional springs may be mounted on the actuating member and on the scanning unit and may have a line of action which is transverse to the direction of the scanning movement and may exert forces urging the scanning unit against the scale member if the scanning unit is guided by the scale member. Such springs will permit of a provision of a larger transverse play and will not tend to vibrate because they are damped by the magnetic forces and by the adhesive force by which the coupling elements are held on each other if they consist of a permanent magnet combination or of a permanent magnet-armature combination.

BRIEF DESCRIPTION OF THE DRAWING

FIG. 6 is a view that is similar to FIGS. 1 and 4 and represents a different length measuring system.

FIG. 7 is a transverse sectional view showing a length measuring system.

FIG. 8 is a transverse sectional view showing a further length measuring system.

DETAILED DESCRIPTION OF THE PREFERRED EMBODIMENTS

Figure 1:
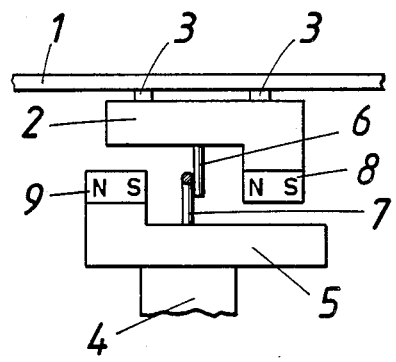
FIG. 1 is a diagrammatic elevation showing partly in section a length measuring system which embodies the invention and has a scale member shown in section.

Illustrative embodiments of the invention will now be described with reference to the drawing.

Figure 2:
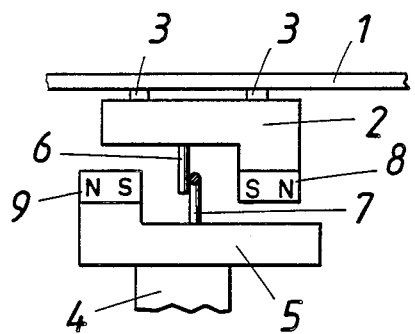
FIG. 2 is an elevation showing a modification of the system of FIG. 1.
Figure 3:
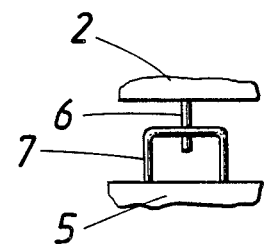
FIG. 3 is a fragmentary side elevation showing a backlashfree coupling which may be used in a system as shown in FIG. 1 or 2.

FIGS. 1 to 3 show a scale member 1, which is provided with a scale, which can be scanned by a scanning unit 2, which has slide shoes 3, which are supported and guided by the scale member. The scanning unit 2 is urged against the scale member from below. No pressure-applying elements are shown in FIGS. 1 and 3. An actuating member 4 is connected to a part which is to be moved during the measurement, such as a carriage of a machine tool, and carries at its top an arm 5, which extends over a major part of the length of the scanning unit 2.

The scanning unit 2 may comprise portions which extend around the scale and which in case of an optoelectronic scanning of the scale may carry means for illuminating scanning sets of the scanning unit 2. In the embodiments shown in FIGS. 1 to 3 a backlashfree coupling provided between the actuating member 4 and the scanning unit 2 consists of two coupling elements 6 and 7. The coupling element 6 consists of a pin 6, which protrudes normal to the direction of the scanning movement of the scanning unit 2 along the scale member 1. The coupling element 7 is U-shaped and comprises a web which is normal to the pin 6 and transverse to the direction of the scanning movement. The coupling elements 6 and 7 cross each other and are circular in cross-section. A point contact between the coupling elements 6 and 7 is maintained by permanent magnets 8 and 9, which are respectively mounted on the scanning unit 2 and on the arm 5 and in the embodiment shown in FIG. 1 have opposite polarities at those surfaces which face each other and face the coupling 6, 7 so that the coupling elements 6 and 7 are urged against each other by the attracting forces exerted by said permanent magnets on each other. In the embodiment shown in FIG. 2 the permanent magnets 8 and 9 have confronting surfaces having the same polarity so that the permanent magnets 8 and 9 exert repelling forces on each other and the pin 6 engages the coupling element 7 on the side which is opposite to the side engaged in FIG. 1.

Figure 4:
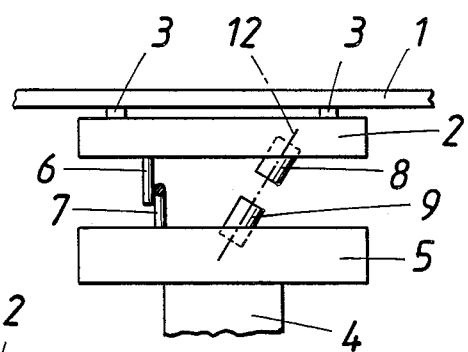
FIG. 4 is an elevation showing a different length measuring system comprising a scale member shown in section.
Figure 5:
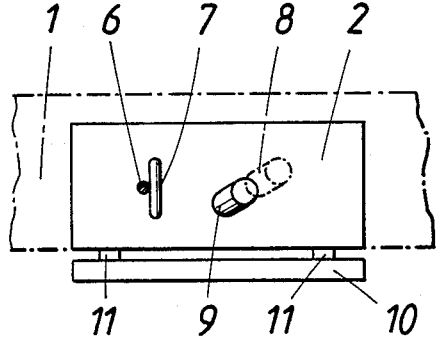
FIG. 5 is a top plan view showing the actuating member and the scanning unit of the system shown in FIG. 4 whereas scale member is indicated only by phantom lines representing its contours.

In the embodiment shown in FIGS. 4 and 5 the scanning unit 2 comprises a bar 10, which engages a free longitudinal edge of the scale member 1 and is supported by sliders 11 also on the adjacent side of the scale member. In order to urge the sliders 3 and 11 against the associated track surfaces of the scale member 1 and to urge the coupling elements 6 and 7 provided at the end of the arm 5 against each other, the magnets 8 and 9 are so arranged that in the side elevation of FIG. 4 and in the top plan view of FIG. 5 the line of action 12 of the magnet 8 and 9 extends at an oblique angle to the longitudinal direction of the scale member. For the sake of clearness the magnets 8 and 9 are shown on the drawing to extend at that angle. Alternatively, the magnets 8 and 9 may be sunk in the rspective members 2 and 5 so that the center lines of the magnets 8 and 9 are normal to and spaced along the scale member to have a line of action 12. In any case the magnets 8 and 9 exert a resulting force having a component by which the coupling elements 6 and 7 are urged against each other and having two other components which urge the sliders 3 against a broadside of the scale member 1 and urge the sliders 11 against a longitudinal edge face of the scale member 1.

In the embodiment shown in FIG. 6 the coupling consists of two U-shaped members 6a and 7a, which are similar to the coupling element 7 and have web portions which are provided at the end of the scanning unit 2 and contact each other and are normal to each other and to the direction of the scanning movement. The arm 5 is provided with a lug 13, which protrudes beyond the end of the scanning unit 2. The magnets 8 and 9 may be arranged like those of FIGS. 4 and 5 to repel each other. If the magnets are only intended to urge the coupling elements 6a, 7a against each other, the magnets may also attract each other in the arrangement indicated by dotted lines.

In the embodiment shown in FIG. 7 the scale member 1 is vertical and secured in a head portion 14 of an enclosure 15 and the scanning unit 2 is provided with sliders 3 and 11, which are guided on the scale member. In a manner which is similar to that shown in FIG. 6 the coupling 6a, 7a is provided at that end of the scanning unit which is not shown in FIG. 7, and the magnets 8 and 9 urge the coupling elements against each other and urge the sliders 3 and 11 against the track surfaces of the scale member 1.

In the embodiment shown in FIG. 8 the arm 5 is coupled to the scanning unit 2 in the manner which has been mentioned with reference to FIG. 7 and the coupling has been indicated at 16. In addition to the magnets 8 and 9, which are not shown, magnets 18 and 19 which cooperate with each other may respectively be provided in the scanning unit 2 and on an upright carrier 17, which protrudes over the rear face of the scale member 1. The magnets 18 and 19 act through the scale member 1 of glass and urge the sliders 3 and 11 to the scanning unit against the scale member.

Figure 9:
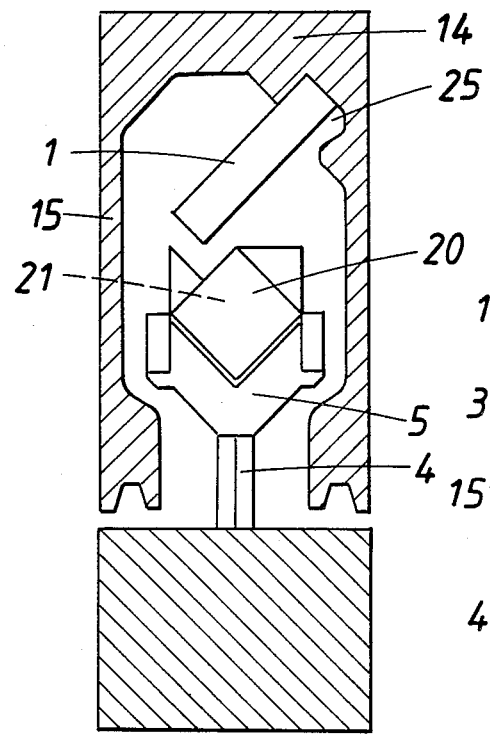
FIG. 9 is a transverse sectional view showing a length measuring system which consists of a scale member, a scanning unit and an actuating member, specifically that portion of such system in which the permanent magnets are provided by which the actuating member is coupled to the scanning unit.
Figure 11:
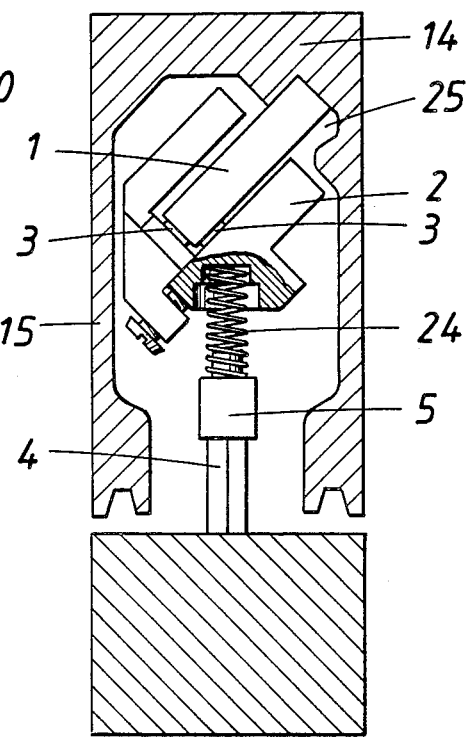
FIG. 10 is a perspective view illustrating the cooperation of a permanent coupling magnet and an associated armature and FIG. 11 is a transverse sectional view showing a portion of a length measuring system in which a pressure-applying spring is mounted.
Figure 10:
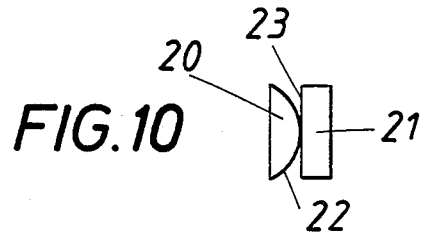

In the embodiment shown in FIGS. 9 to 11, the scanning unit is provided with ball rollers 3, which are guided on the scale member 1 and are urged from below against the scale member 1. A backlashfree coupling between the actuating member 4 and the scanning unit 2 comprises a permanent magnet 20 and an armature 21, which are respectively mounted on the scanning unit 2 and on the arm 5 of the actuating member 4 and have lines of action which are parallel to the direction of the scanning movement. In accordance with FIG. 10 the the biasing parts 20 and 21 have confronting part-cylindrical curved surfaces 22 and 23, which are centered on axes extending at right angles to each other and at an angle of 45° to the arm 5 and maintain a backlashfree contact between the parts 5 and 12. At least one compression spring 24 bears on the extension 5 and is spaced from the permanent magnet-armature combination 20, 21 and urges the rollers 3 against the two track surfaces of the scale member 1. The scale member 1 is fixed in a groove 25 of the tubular enclosure 15. Other details have not been shown because they will become apparent from the foregoing description of the other figures.

We claim:

1. In a length measuring system comprising
    an elongate scale member,
    track means, which are parallel to the longitudinal direction of said scale member,
    a scanning unit, which is mounted to be movable along said scale member and is guided by said track means in said longitudinal direction.
    an actuating member for moving said scanning unit along said scale member, and
    a backlashfree coupling, which connects said actuating member to said scanning unit and permits said actuating member to move relative to said scanning unit in a direction which is transverse to said longitudinal direction and comprises two coupling elements, which are connected to said scanning unit and to said actuating member, respectively, and have engaging surfaces, which are substantially in point contact with each other and are curved about crossing axes, which are substantially normal to said scale member, wherein
    biasing means are provided, which act on said scanning unit and said actuating member and urge said coupling elements against each other,
    the improvement residing in that
    said biasing means comprise at least one permanent-magnetic biasing set, which consists of a permanent-magnetic part and a second part, which parts are connected to said scanning unit and to said actuating member, respectively and exert magnetic forces on each other.

2. The improvement set forth in claim 1 in which said track means are provided on said scale member.

3. The improvement set forth in claim 2, wherein spring means are provided, which are arranged to act on said actuating member and on said scanning unit to urge said scanning unit against said scale member and have lines of action which are transverse to said longitudinal direction.

4. The improvement set forth in claim 1 in which said track means are separate from said scale member.

5. The improvement set forth in claim 1, wherein said second part consists of a second permanent-magnetic part.

6. The improvement set forth in claim 1, wherein said second part consists of an armature.

7. The improvement set forth in claim 1, wherein said coupling elements consist of two round coupling pins, which cross each other at right angles and have engaging portions which are adapted to contact each other and are formed with said engaging surfaces which pins are so mounted that said engaging portions are held against a movement in a direction transverse to said longitudinal direction.

8. The improvement set forth in claim 1, wherein said parts of said permanent-magnetic biasing set are arranged to exert magnetic forces on lines of action which are at an oblique angle to said longitudinal direction so that said parts exert a magnetic force on each other which has one component urging said coupling elements against each other and at least one additional component urging said scale member against said track means.

9. The improvement set forth in claim 1, wherein
    at least one additional permanent-magnetic biasing set is provided, which consists of a permanent-magnetic part and a second part, which parts of said additional permanent-magnetic biasing set are connected to said scanning unit and to said actuating member, respectively, and exert magnetic forces on each other to urge said scanning unit against said track means.

10. The improvement set forth in claim 9, wherein
    said track means are provided on said scale member and
    said parts of said additional permanent-magnetic biasing set are arranged to exert forces on each other to urge said scanning unit against said scale member.

11. The improvement set forth in claim 9, wherein said scanning unit is provided with low-friction means in contact with said track means.

12. The improvement set forth in claim 11, wherein said low-friction means consist of sliders.

13. The improvement set forth in claim 11, wherein said low-friction means consist of rollers.

14. The improvement set forth in claim 9, wherein said second part of said additional permanent-magnetic biasing set consists of a second permanent-magnetic part.

15. The improvement set forth in claim 9, wherein said second part of said additional permanent-magnetic biasing set consists of an armature.

16. The improvement set forth in claim 9, in which said scale member consists of glass and has a front side and a rear side and said scanning unit extends on said front side, wherein
    said actuating member extends on said rear side and in at least one of said permanent-magnetic biasing sets one of said parts thereof is mounted on said scanning unit on said front side and the other of said parts is mounted on said actuating member on the rear side of said scale member in such a manner that each of said parts is spaced from said scale member.

17. The improvement set forth in claim 1, wherein
    each of said coupling elements constitutes one of said parts of said permanent-magnetic biasing set and
    said curved engaging surfaces are formed on said parts of said permanent-magnetic biasing set and cross each other at right angles.

18. The improvement set forth in claim 1, wherein said parts of said permanent-magnetic biasing set have lines of action extending in said longitudinal direction.

19. The improvement set forth in claim 1, wherein said parts of said permanent-magnetic biasing set exert magnetic forces on each other which have at least a component in said longitudinal direction.

* * * * *